3,391,991
PRODUCTION OF SODIUM TRIPOLYPHOSPHATE
John Fred Herink, Rock Springs, and Harold J. Comer, Green River, Wyo., assignors to FMC Corporation, New York, N.Y., a corporation of Delaware
Filed Aug. 8, 1966, Ser. No. 570,804
4 Claims. (Cl. 23—107)

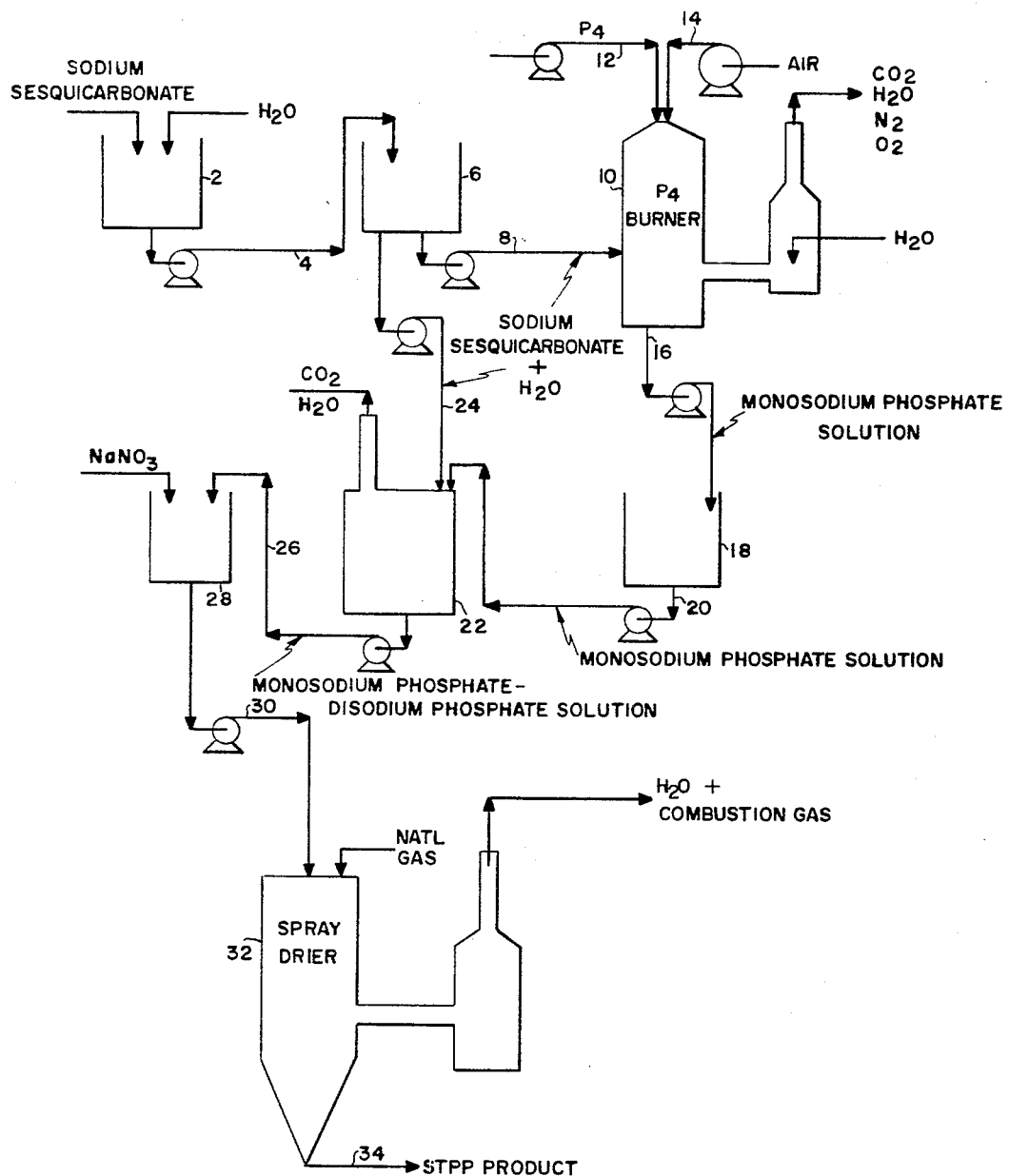

The present invention is concerned with the formation of sodium tripolyphosphate and, more specifically, to the manufacture of sodium tripolyphosphate in which the required sodium values are derived from sources other than soda ash.

In the formation of modern heavy-duty detergent compositions sodium tripolyphosphate (STPP) has come into widespread use as a phosphate "builder" in order to increase the cleaning ability of these detergent compositions. The general method for producing STPP is to react phosphoric acid (herein used to mean either the anhydride $P_2O_5$ or the acid itself) and sodium carbonate (soda ash) together in an aqueous solution until the mole ratio of sodium to phosphorus is of the order of about 5:3. The reaction results in formation of an aqueous mixture containing monosodium orthophosphate and disodium orthophosphate in a mole ratio of about 1:2. The aqueous mixture is then passed through a heating zone and its temperature is increased to remove free water. At a temperature of about 250° C. or higher STPP is formed.

The soda ash used in this process can be produced by a number of methods including the classical Solvay or ammonia-soda process or the sesquicarbonate system described in U.S. Patent 3,028,215 issued on Apr. 3, 1962 to William R. Frint. In this latter process crude trona is dissolved in an aqueous solvent and the solution is filtered and purified to remove natural impurities in the mineral trona. Thereafter the solution is cooled and concentrated to precipitate monoclinic sodium sesquicarbonate crystals. These crystals are separated by a centrifugal separator from the mother liquor and are recovered as a centrifuge cake. The sesquicarbonate centrifuge cake is passed into a calciner and calcined in a nonreactive atmosphere at high temperatures until it is converted into dense soda ash ($Na_2CO_3$).

One drawback to using soda ash as a reactant with phosphoric acid is that the resulting reaction is difficult to control because substantial amounts of both carbon dioxide and heat are evolved. In this reaction a concentrated soda ash solution, which has a pH of about 12 or above, must be reduced by reaction with the phosphoric acid to a pH of about 4.0–4.6 evolving copious amounts of $CO_2$ and releasing the large heat of neutralization. As a result there is a need for a system wherein a sodium phosphate mixture can be made up under more easily controllable conditions and with less heat of neutralization.

It is an object of the present invention to produce STPP in which the sodium values therein are supplied by compounds other than soda ash.

It is a further object of the present invention to react phosphoric acid with a sodium salt in which the reaction is more readily controlled and in which less heat of neutralization is evolved.

This and other objects will be apparent from the following disclosure.

We have now found that STPP can be formed in a more readily controlled reaction by reacting phosphoric acid with an aqueous slurry of sodium sesquicarbonate in mole proportions sufficient to form a sodium phosphate mixture having a sodium to phosphorus mole ratio on the order of about 5:3 and a specific gravity of from about 1.5 to about 1.65, heating said sodium phosphate mixture to at least 250° C., removing uncombined water therefrom and recovering STPP from the heated reaction mixture.

The use of aqueous slurries of sodium sesquicarbonate in place of soda ash in the above process has been found to have many advantages. Among these is that sodium sesquicarbonate does not result in as violent a reaction with phosphoric acid as soda ash when forming a sodium phosphate solution. In addition, the sodium sesquicarbonate, which contains 2 moles of water of crystallization per mole of sodium sesquicarbonate, requires the use of much less water since the water in the sesquicarbonate crystal is utilized in the process. Further, the slurry of sodium sesquicarbonate which has a maximum pH of about 9.4 is much less alkaline and more easily handled than the comparable solution or slurry of soda ash which has a pH of about 12.

In carrying out the present invention a slurry of sodium sesquicarbonate and water is made up. The precise ratio of sesquicarbonate to water is determined by the specific gravity of the mixture which is desired to supply the proper amount of sodium values per unit amount of phosphorus. In general a weight ratio of sodium sesquicarbonate to water of about 1:1 has been found desirable. This slurry is then reacted with either phosphoric acid or anhydrous phosphoric, acid, i.e., $P_2O_5$, to form a solution of monosodium phosphate. This reaction occurs in accordance with the following equation:

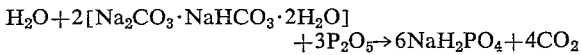

The resulting monosodium phosphate solution normally has a pH ranging from about 4.0 to about 4.6 and a specific gravity on the order of about 1.5 to 1.7. To this solution is then added additional amounts of the sodium sesquicarbonate slurry to convert enough of the monosodium phosphate to disodium phosphate in order to obtain a solution whose sodium to phosphate mole ratio is about 5:3. This reaction occurs in accordance with the following equation:

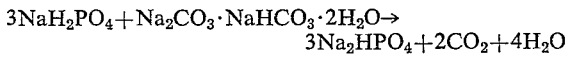

The resulting solution should have a monosodium phosphate content of about 17%, a disodium phosphate content of about 40% and a specific gravity on the order of about 1.6. This solution is then fed into a heating zone, such as a spray dryer, rotary kiln or fluidized bed where the water of solution is evaporated and the mixture of monosodium phosphate-disodium phosphate can react at temperatures of at least about 250° C. to form the STPP product. Where desired, an oxidizing agent such as sodium nitrate may be added to the solution of monosodium phosphate and disodium phosphate to oxidize any organics or sulfides present in the mixture fed to the heating zone.

In the above description of the invention the slurry of sodium sesquicarbonate was added to the phosphoric acid in two separate stages. While this two stage technique is preferred since it assures obtaining an initial monosodium phosphate solution having the correct pH and specific gravity prior to conversion of a portion of the monosodium phosphate to disodium phosphate, it is to be understood that all of the required amount of sesquicarbonate can be added in one step.

The invention will now be described by reference to the attached drawing which is a diagrammatical sketch of the preferred process.

As shown in the drawing a slurry of sodium sesquicarbonate and water is prepared in mixing tank 2 and is conveyed through line 4 to a holding tank 6. A portion of the sodium sesquicarbonate slurry is then removed from holding tank 6 through line 8 and passed into a phosphorus burner 10. In this unit phosphorus is admitted into the top of the burner 10 through line 12. Air, necessary to support the combustion of the phosphorus is admitted through line 14 into the top of burner 10 along with the phosphorus. The phosphorus is burned and produces the anhydride of phosphoric acid ($P_2O_5$) in burner 10. The phosphoric acid anhydride is then reacted with the sesquicarbonate slurry from line 8 to form a monosodium phosphate solution. This solution is removed from the base of burner 10 through line 16 and placed in a holding tank 18. The solution in holding tank 18 has a specific gravity of about 1.6 and its pH between 4.0 and 4.6. Incremental addition of sodium sesquicarbonate or water to holding tank 18 may be necessary to adjust the pH or specific gravity of the solution. The monosodium phosphate solution is removed from holding tank 18 through line 20 and passed into reactor 22. An additional quantity of sodium sesquicarbonate slurry from holding tank 6 is passed through line 24 into reactor 22 in an amount sufficient to convert sufficient amounts of the monosodium phosphate to disodium phosphate such that the mole ratio of sodium to phosphorus in the solution is about 5:3. The resulting solution of monosodium phosphate and disodium phosphate is passed through line 26 into a mixing tank 28 where an oxidizer such as sodium nitrate is added. This oxidizing agent is helpful in oxidizing organics or sulfides during the subsequent STPP production step. The solution in mixing tank 28 is then passed by means of line 30 to a spray dryer 32 where the water of solution is rapidly evaporated and the resulting monosodium phosphate and disodium phosphate are converted to STPP at a temperature of from 280° to 500° C. The resulting STPP product is recovered at the base of the spray dryer 32 from line 34.

The following examples are given to illustrate the present invention and are not deemed to be limiting thereof.

Example 1

The following example was carried out using the same flow plan and diagrammatical steps set forth in the drawing. A sodium sesquicarbonate slurry containing 1022 lbs. of sodium sesquicarbonate and 1079 lbs. of water was prepared in mixing tank 2 and passed into a holding tank 6. The slurry in holding tank 6 contained 2101 lbs. of solution and had a specific gravity of 1.45. A mixture of 614 lbs. of sesquicarbonate and 648 lbs. of water were then passed into a phosphorus burner 10 and reacted with the phosphoric acid anhydride formed by burning 253 lbs. of phosphorus with 1716 lbs. of air. Additional water was added to the phosphorus furnace to aid in absorbing the phosphorus values. The resulting reaction of the sodium sesquicarbonate slurry and the phosphoric acid anhydride results in the release of 239 lbs. of carbon dioxide. A monosodium phosphate solution was removed from the base of the burner 10 weighing 1554 lbs. having a pH of 4.3 and a specific gravity of 1.6. This solution was passed into a holding tank 18 and subsequently fed to a reactor 22 along with a slurry of 408 lbs. of sodium sesquicarbonate and 431 lbs. of water from holding tank 6. The reaction resulted in the release of 159 lbs. of carbon dioxide and the recovery of 1922 lbs. of a monosodium phosphate-disodium phosphate solution having an Na:P mole ratio of 1.667:1. This solution was passed into a mixing tank 28 and 6.16 lbs. of sodium nitrate was added to the solution and thoroughly mixed in. Additional water was added to adjust the specific gravity to about 1.6. The solution removed from mixing tank 28 contained 329 lbs. of monosodium phosphate, 729 lbs. of disodium phosphate, 824 lbs. of water, and about 6 lbs. of sodium nitrate. This solution was then passed into a spray dryer 32 and the solution was spray dried by means of a spray dryer operating at 350° C. which burned natural gas, to yield STPP. The spray dryer required 43 lbs. of natural gas to convert the mixture to about 1000 lbs. of STPP product. Overhead from the spray dryer 929 lbs. of water and 740 lbs. of combustion gas was removed.

Example 2

Elemental yellow phosphorus was burned in a phosphorus burner with excess oxygen to form gaseous $P_2O_5$. The resultant $P_2O_5$ was absorbed in an aqueous monosodium phosphate solution having a specific gravity of 1.605 and containing about 65.5% monosodium phosphate. The monosodium phosphate solution was maintained at 99° C. and was recycled in the phosphorus burner at a ratio of about 230 parts per part of phosphorus burned. There was also added to the recycle stream 2.425 parts of sodium sesquicarbonate per part of phosphorus burned. This amount of sodium sesquicarbonate was sufficient to react with the absorbed $P_2O_5$ to produce monosodium phosphate and to hold the pH of the resulting solution at about 4.4. In order to maintain the monosodium phosphate solution at equilibrium 7.0 parts of water were added. Thereafter, 5.950 parts of the monosodium phosphate solution (containing about 65.5% monosodium phosphate and having a specific gravity of 1.605) were removed and further reacted with 1.61 parts of sodium sesquicarbonate to form 7.41 parts of a phosphate solution containing 17.1% monosodium phosphate and 40.5% disodium phosphate. This phosphate solution had a specific gravity of 1.61 and a sodium to phosphorus mole ratio of 1.667:1. The phosphate solution, at a temperature of 105° C., was then fed into a spray dryer and the water of solution evaporated. The resulting monosodium phosphate-disodium phosphate residue was heated to 319° C. and retained at this temperature for 15 minutes after which 3.925 parts of STPP were recovered.

Example 3

Elemental yellow phosphorus was burned in a phosphorus burner with excess oxygen to form gaseous $P_2O_5$. The resultant $P_2O_5$ was absorbed in an aqueous monosodium phosphate solution having a specific gravity of 1.605 and containing about 65.5% monosodium phosphate. The monosodium phosphate solution was maintained at 98° C. and was recycled in the phosphorus burner at a ratio of about 230 parts per part of phosphorus burned. There was also added to the recycle stream 2.435 parts of sodium sesquicarbonate per part of phosphorus burned. This amount of sodium sesquicarbonate was sufficient to react with the absorbed $P_2O_5$ to produce monosodium phosphate and to hold the pH of the resulting solution at about 4.5. In order to maintain the monosodium phosphate solution at equilibrium 7.1 parts of water were added. Thereafter 5.955 parts of the monosodium phosphate solution (containing about 65.5% monosodium phosphate and having a specific gravity of 1.605) were removed and further reacted with 1.61 parts of sodium sesquicarbonate to form a solution containing 17.0% monosodium phosphate and 40.20% disodium phosphate. The phosphate solution had a specific gravity of 1.608 and a sodium to phosphorus mole ratio of 1.670:1. The phosphate solution, at a temperature of 105° C., was then fed into a spray dryer and the water of solution evaporated. The resulting monosodium phosphate-disodium phosphate residue was heated at 370° C. and retained at this temperature for 15 minutes after which 3.920 parts of STPP were recovered.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. The process of producing sodium tripolyphosphate comprising reacting a phosphoric acid with an aqueous slurry of sodium sesquicarbonate to form a sodium phosphate solution having a mole ratio of Na:P of about 5:3 and a specific gravity of from about 1.5 to 1.65, passing said sodium phosphate solution into a heating zone, heating said solution in said heating zone to at least about 250° C., removing free water and converting the residual sodium phosphate to sodium tripolyphosphate and recovering said sodium tripolyphosphate.

2. Process of claim 1 wherein the specific gravity of said sodium phosphate solution is 1.6.

3. Process of claim 1 wherein said solution is sprayed into said heating zone and said free water is flash evaporated and said residual sodium phosphate is rapidly converted to sodium tripolyphosphate.

4. Process of claim 3 wherein the heating zone wherein said sodium phosphate solution is sprayed is at a temperature of 350° C.

No references cited.

OSCAR R. VERTIZ, *Primary Examiner.*

L. A. MARSH, *Assistant Examiner.*